(12) United States Patent  
Fukukita (10) Patent No.: US 7,658,110 B2  
(45) Date of Patent: Feb. 9, 2010

(54) ULTRASONIC DIAGNOSTIC SYSTEM

(75) Inventor: Hiroshi Fukukita, Tokyo (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 11/568,953

(22) PCT Filed: Sep. 9, 2005

(86) PCT No.: PCT/JP2005/016615

§ 371 (c)(1),
(2), (4) Date: Nov. 10, 2006

(87) PCT Pub. No.: WO2006/035588

PCT Pub. Date: Apr. 6, 2006

(65) Prior Publication Data

US 2007/0225604 A1    Sep. 27, 2007

(30) Foreign Application Priority Data

Sep. 29, 2004    (JP) .............................. 2004-284871

(51) Int. Cl.
*G01N 29/00* (2006.01)
*A61B 8/00* (2006.01)

(52) U.S. Cl. ............................ 73/620; 73/625; 73/626; 600/443; 600/447; 600/459

(58) Field of Classification Search ................... 73/620, 73/625, 626; 600/443, 447, 459; 128/916
See application file for complete search history.

(56) References Cited

U.S. PATENT DOCUMENTS

| | | | | |
|---|---|---|---|---|
| 4,890,268 A | * | 12/1989 | Smith et al. .................. | 367/138 |
| 5,203,336 A | * | 4/1993 | Iida et al. ..................... | 600/463 |
| 5,235,983 A | * | 8/1993 | Iida et al. ..................... | 600/443 |
| 5,808,967 A | * | 9/1998 | Yu et al. ........................ | 367/91 |
| 5,997,479 A | * | 12/1999 | Savord et al. ................ | 600/447 |

(Continued)

FOREIGN PATENT DOCUMENTS

JP          4-161878          6/1992

(Continued)

*Primary Examiner*—Hezron Williams
*Assistant Examiner*—J M Saint Surin
(74) *Attorney, Agent, or Firm*—Hamre, Schumann, Mueller & Larson, P.C.

(57) ABSTRACT

An ultrasonic diagnostic system includes electroacoustic conversion means in which a plurality of sub-arrays, each composed of a plurality of electroacoustic transducers, are arranged at least two-dimensionally, sub-beam formers that are provided on the sub-array basis, and a main beam former for subjecting signals output from the sub-beam formers to delay addition. Each sub-beam former generates signals having polarities different from each other from each of received signals from the electroacoustic transducers in the sub-array, obtains a first signal and a second signal that are obtained by controlling amplitudes of signals having different polarities generated from the received signals from the electroacoustic transducers in the sub-array, followed by adding, imparts a delay time difference corresponding to a quarter of one period of the received signal between the first signal and the second signal by first delay means composed of a capacitor memory provided inside, and adds the first signal and the second signal to which the delay time difference is imparted. The ultrasonic diagnostic system with this configuration is capable of phasing a received signal with high precision.

7 Claims, 6 Drawing Sheets

U.S. PATENT DOCUMENTS

| | | |
|---|---|---|
| 6,013,032 A | 1/2000 | Savord |
| 6,126,602 A * | 10/2000 | Savord et al. ............... 600/447 |
| 6,491,634 B1 * | 12/2002 | Leavitt et al. ............... 600/447 |
| 7,322,936 B2 * | 1/2008 | Takeuchi ................... 600/447 |
| 7,455,642 B2 * | 11/2008 | Fukukita ................... 600/447 |

FOREIGN PATENT DOCUMENTS

WO    WO 02/17298    2/2002

* cited by examiner

ULTRASONIC DIAGNOSTIC SYSTEM

TECHNICAL FIELD

The present invention relates to an ultrasonic diagnostic system that has a two-dimensional array in which vibrators are arranged, and scans a subject three-dimensionally.

BACKGROUND ART

Figure 4:
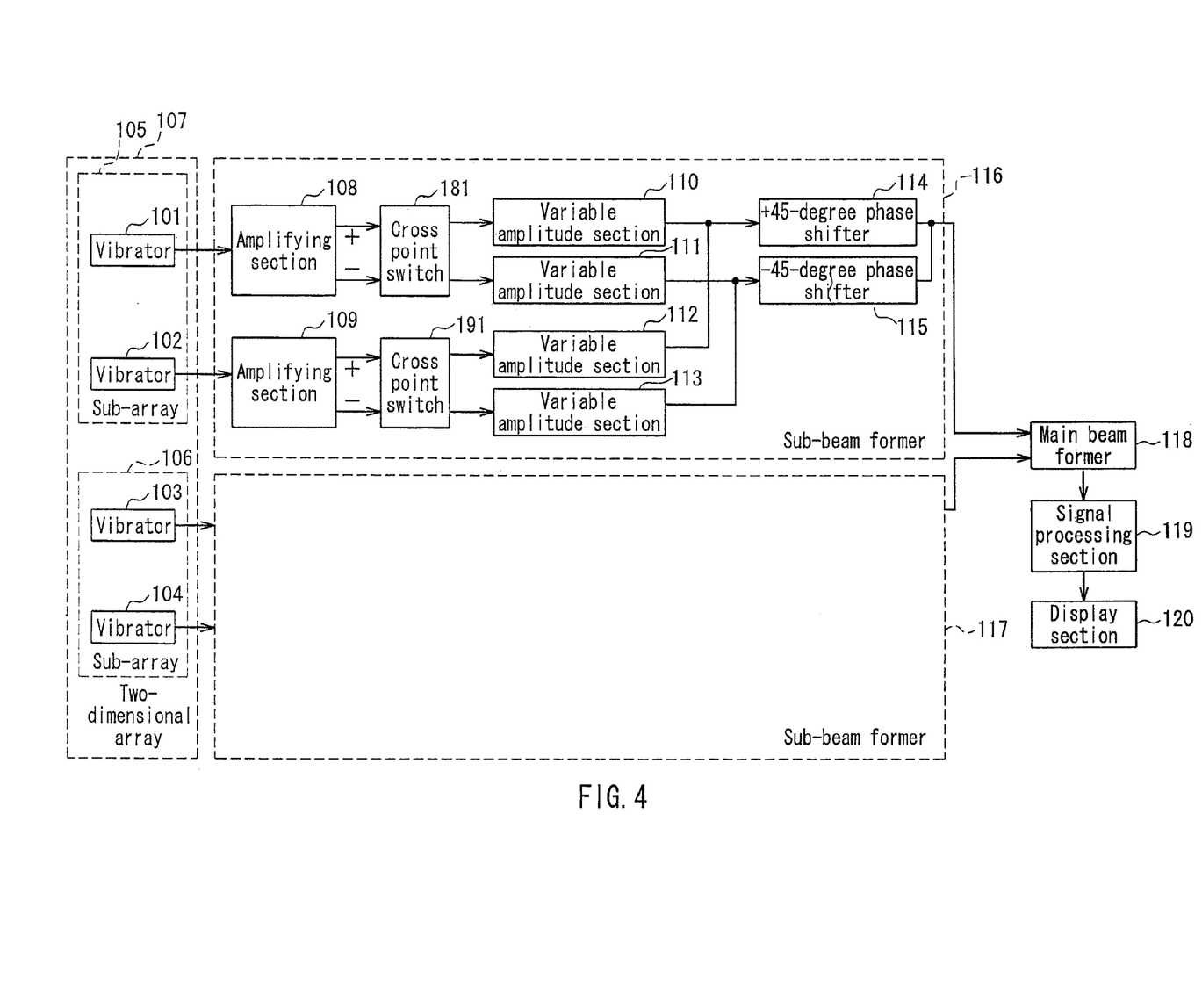
FIG. 4 is a block diagram showing an exemplary configuration of a conventional ultrasonic diagnostic system.

As shown in FIG. 4, a conventional ultrasonic diagnostic system includes a two-dimensional array 107 in which a sub-array 105 composed of vibrators 101, 102, and a sub-array 106 composed of vibrators 103, 104 are arranged two-dimensionally. Received signals from the vibrators 101, 102 constituting the sub-array 105 respectively are input to amplifying sections 108, 109, and the amplifying sections 108, 109 output a non-inverted output signal (+) and an inverted output signal (−).

The non-inverted output signal (+) and the inverted output signal (−) output from the amplifying section 108 respectively are supplied to variable amplitude sections 110, 111 via a cross point switch 181. Furthermore, the non-inverted output signal (+) and the inverted output signal (−) output from the amplifying section 109 respectively are supplied to the variable amplitude sections 112, 113 via a cross point switch 191.

A signal output from the variable amplitude section 110 and a signal output from the variable amplitude section 112 are added to be input to a +45-degree phase shifter 114. Further, a signal output from the variable amplifier 111 and a signal output from the variable amplifier 113 are added to be input to a −45-degree phase shifter 115.

The output signals from the +45-degree phase shifter 114 and the −45-degree phase shifter 115 are added to be input to a main beam former 118.

As described above, the amplifying sections 108, 109, the cross point switches 181, 191, the variable amplitude sections 110, 111, 112, 113, the +45-degree phase shifter 114, and the −45-degree phase shifter 115 constitute a sub-beam former 116.

Furthermore, received signals from the vibrators 103, 104 constituting the sub-array 106 are input to a sub-beam former 117. It should be noted that the internal configuration of the sub-beam former 117 is the same as that of the sub-beam former 116. The signals output from the sub-beam formers 116 and 117 are subjected to delay addition by the main beam former 118, and are input to the signal processing section 119. The signal input to the signal processing section 119 is processed to be converted to an image signal, and displayed on a display section 120.

In the above-mentioned configuration of the sub-beam formers 116 and 117, the amplitudes of the received signals are controlled by the cross point switches 181, 191 and the variable amplitude sections 110 to 113, whereby the phases of the received signals are controlled, and the received signals from the vibrators in the sub-array are phased (e.g., see Patent document 1).

Patent document 1: U.S. Pat. No. 6,013,032 (col. 8-10, FIGS. 6, 7, and 9)

DISCLOSURE OF INVENTION

Problem to be Solved by the Invention

However, in the conventional ultrasonic diagnostic system, there is the following problem: in order to shift the phase of a received signal, ±45-degree (±π/4) phase shifters in two channels are installed, which makes it difficult to adjust phases thereof each other with good precision due to the component precision variations between the phase shift circuits in the respective phase shifters.

The present invention has been achieved in order to solve the conventional problem, and its object is to provide an ultrasonic diagnostic system capable of phasing a received signal with good precision.

Means for Solving Problem

In order to achieve the above-described object, the ultrasonic diagnostic system according to the present invention comprises: electroacoustic conversion means in which a plurality of sub-arrays, each composed of a plurality of electroacoustic transducers, are arranged at least two-dimensionally; sub-beam formers that are provided on the sub-array basis, for subjecting signals output from the electroacoustic conversion means to delay addition; and a main beam former for subjecting signals output from the sub-beam formers to delay addition, wherein each sub-beam former, from each of received signals from the electroacoustic transducers in the sub-array, generates a non-inverted signal and an inverted signal having different polarities from each other, respectively, obtains a first signal by controlling amplitudes of the signals having a first polarity among the polarities, followed by adding, and obtains a second signal by controlling amplitudes of the signals having a second polarity among the polarities, followed by adding, imparts a delay time difference corresponding to a quarter of one period of the received signal between the first signal and the second signal by first delay means composed of a capacitor memory provided inside, and adds the first signal and the second signal to which the delay time difference is imparted.

With this configuration, the received signal can be phased with high precision.

Further, in the ultrasonic diagnostic system according to the present invention, each sub-beam former includes: amplifying sections provided on the sub-array basis, each amplifying section generating a non-inverted signal and an inverted signal that have different polarities from each other, from a received signal from the corresponding electroacoustic transducer in the sub-array; cross point switches, each selectively switching the non-inverted signal and the inverted signal output from the corresponding amplifying section and outputting the same; variable amplitude sections for outputting the first signal and the second signal, the first signal being obtained by controlling amplitudes of the signals that are output from the cross point switches and that have a first polarity among the polarities, followed by adding, and the second signal being obtained by controlling amplitudes of the signals that are output from the cross point switches and that have a second polarity among the polarities, followed by adding; a delay section for imparting a delay time difference corresponding to a quarter of one period of the received signal between the first signal and the second signal output from the variable amplitude sections; and an adding section for adding an output signal from the delay section and output signals from the variable amplitude sections.

Still further, in the ultrasonic diagnostic system according to the present invention, the capacitor memory includes: at least one N-ary counter (N≧2); a writing decoder that receives a count value output from the counter and outputs N writing control signals; N writing switches that commonly receive the first signal at ends thereof, and are turned on/off according to the N writing control signals, respectively; N capacitors whose ends are connected to the other ends of the N writing switches and whose other ends are connected to a ground potential; a reading decoder that receives the count value output from the counter and outputs N reading control signals; N reading switches that receive potentials of the N capacitors at ends thereof, respectively, are turned on/off according to the N reading control signals, respectively, and output delay signals of the first signal via the other ends thereof that are connected commonly; and second delay means for imparting a delay time difference between an operation of the writing decoder and an operation of the reading decoder.

In this case, the counter preferably can be set to be M-ary ($M \leq N$) according to a frequency of the received signal.

Further, the counter preferably is composed of a writing counter outputting a count value to the writing decoder, and a reading counter outputting a count value to the reading decoder, and the second delay means is a first delay circuit (latch) for delaying an operation initiation timing of the writing counter.

Alternatively, the second delay means is disposed between an output end of the counter and an input end of the reading decoder, or between the output end of the counter and an input end of the writing decoder, and is means (adder or subtracter) for incrementally increasing or decreasing the count value output from the counter.

Still alternatively, the second delay means preferably is disposed between an output end of the counter and an input end of the writing decoder, and is a second delay circuit (latch) for delaying the count value output from the counter.

Effects of the Invention

According to the present invention, the following special effect is exhibited: an ultrasonic diagnostic system capable of phasing a received signal from an electroacoustic transducer in a two-dimensional array with high precision can be provided.

DESCRIPTION OF REFERENCE NUMERALS 1 to 4 vibrator
5, 6 sub-array
7 two-dimensional array (electroacoustic conversion means)
8, 9 amplifying section
10 to 13 variable amplitude section
14 delay section (first delay means)
15 adding section
16, 17 sub-beam former
18 main beam former
21, 25 amplifier
22 writing decoder
23 writing counter (counter)
24 latch (first delay circuit as second delay means)
26 reading decoder
27 reading counter (counter)
28 adder (means for incrementally increasing or decreasing a count value, as second delay means)
29 latch (second delay circuit as second delay means)

DESCRIPTION OF THE INVENTION

Hereinafter, preferable embodiments of the present invention will be described with reference to the drawings.

First Embodiment

Figure 1A:
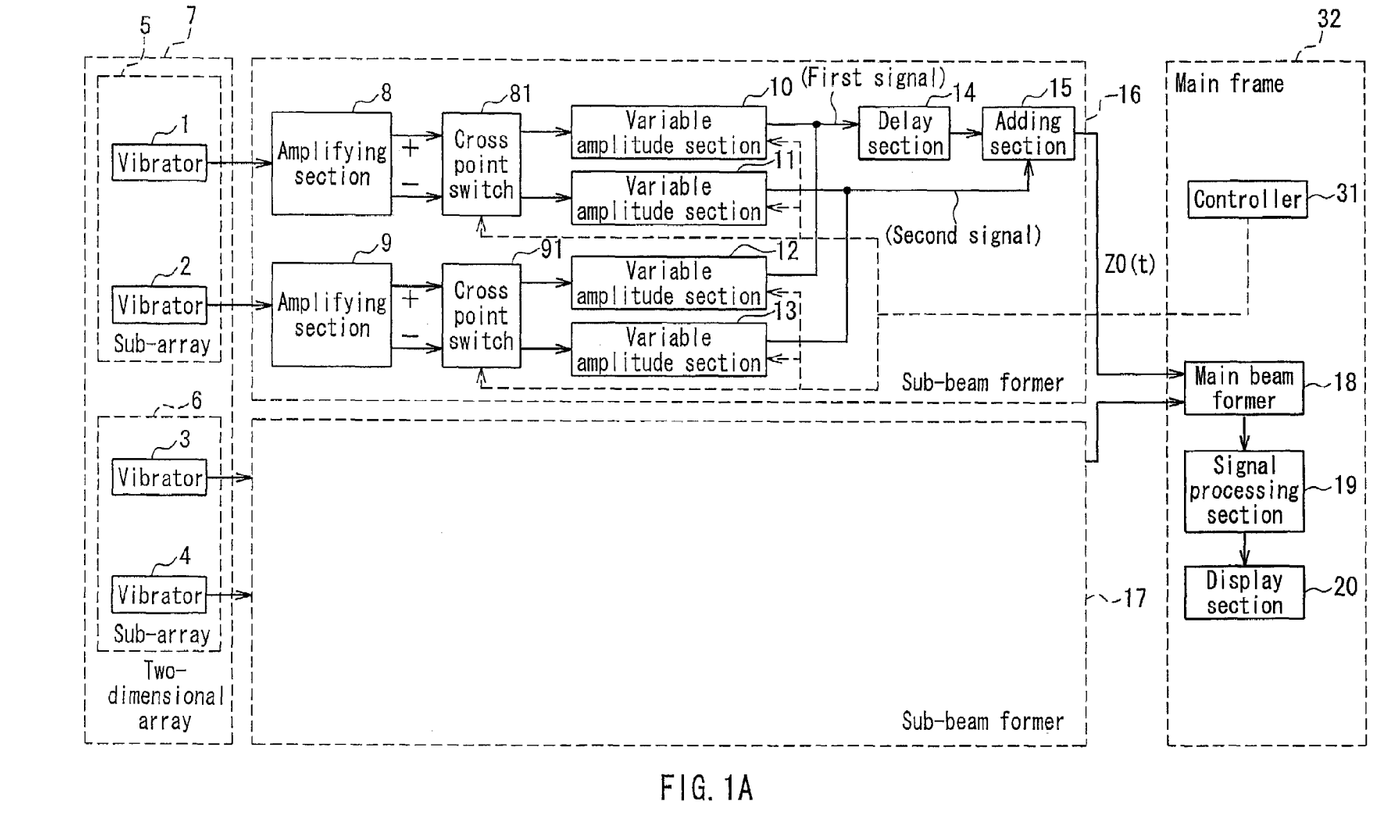
FIG. 1A is a block diagram showing one exemplary configuration of a receiving section in an ultrasonic diagnostic system according to a first embodiment of the present invention.

FIG. 1A is a block diagram showing one exemplary configuration of a receiving section in an ultrasonic diagnostic system according to a first embodiment of the present invention.

Figure 1B:
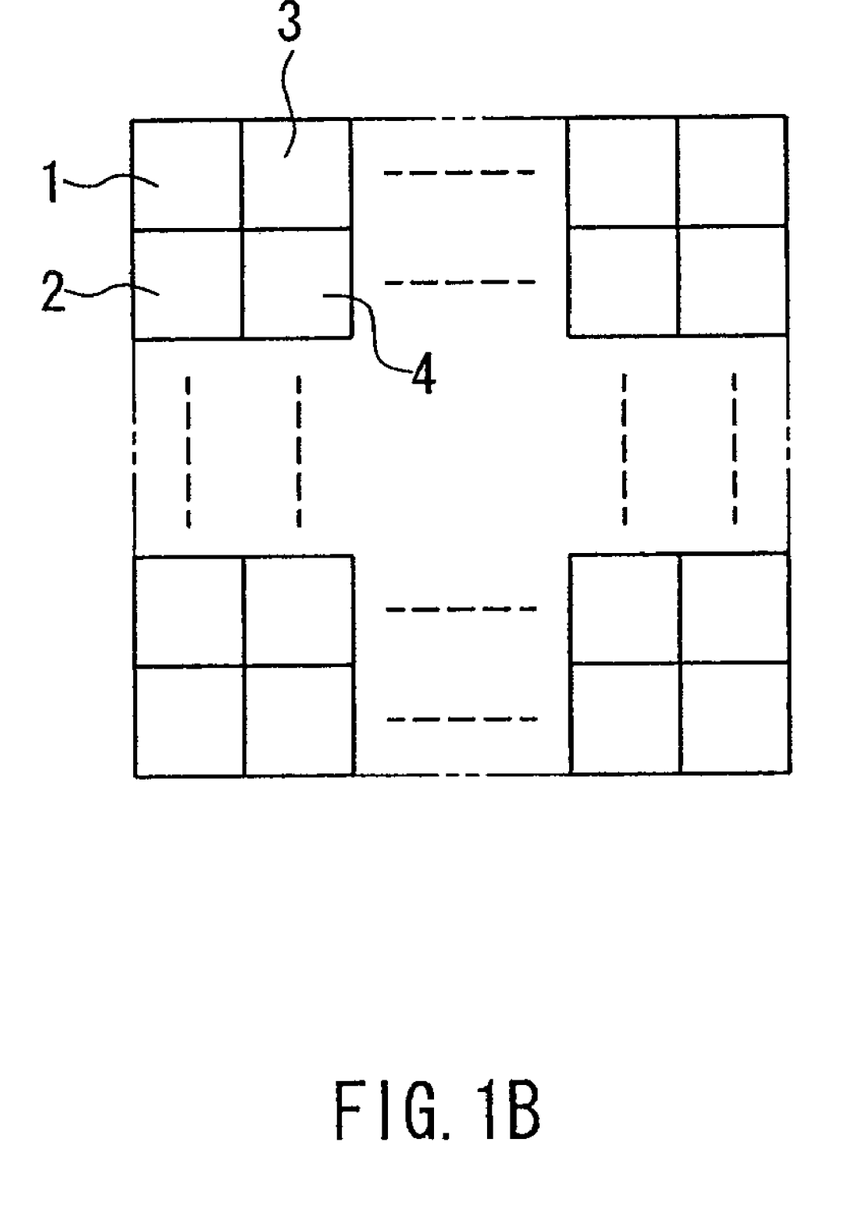
FIG. 1B is a schematic diagram showing an exemplary configuration of a two-dimensional array composed of a number of vibrators including vibrators 1 to 4 in FIG. 1A.

In FIG. 1A, vibrators 1 to 4 are composed of electroacoustic transducers, and convert an acoustic echo signal to a received signal. The vibrators 1 and 2 constitute a sub-array 5, the vibrators 3 and 4 constitute a sub-array 6, and the sub-arrays 5 and 6 constitute a two-dimensional array 7. Although only the vibrators 1 to 4 are illustrated in FIG. 1A, actually, a number of vibrators are arranged two-dimensionally as shown in FIG. 1B.

Amplifying sections 8, 9 respectively output a non-inverted output signal (+) and an inverted output signal (−) of the received signals from the vibrators 1, 2. Variable amplitude sections 10, 11 are connected to the amplifying section 8 via a cross point switch 81, and variable amplitude sections 12, 13 are connected to the amplifying section 9 via a cross point switch 91. The output signals of the variable amplitude sections 10, 12 are added, and the signal thus obtained by addition (first signal) is supplied to a delay section 14 (first delay means). Furthermore, the output signals of the variable amplitude sections 11, 13 are added, and the signal thus obtained by addition (second signal) is added to the output signal of the delay section 14 in an adding section 15.

As described above, the amplifying sections 8, 9, the cross point switches 81, 91, the variable amplitude sections 10, 11, 12, 13, the delay section 14, and the adding section 15 constitute a sub-beam former 16.

Furthermore, the received signals from the vibrators 3, 4 are input to a sub-beam former 17. The internal configuration of the sub-beam former 17 is the same as that of the sub-beam former 16.

The output signals of the sub-beam formers 16, 17 are subjected to delay addition by a main beam former 18. The output signal of the main beam former 18 is processed to be an image signal by a signal processing section 19. The image signal from the signal processing section 19 is displayed on a display section 20. A controller 31 controls the switching control with respect to the cross point switches 81 and 91, and coefficients of the variable amplitude sections 10, 11, 12, and 13, which will be described later.

Figure 1C:
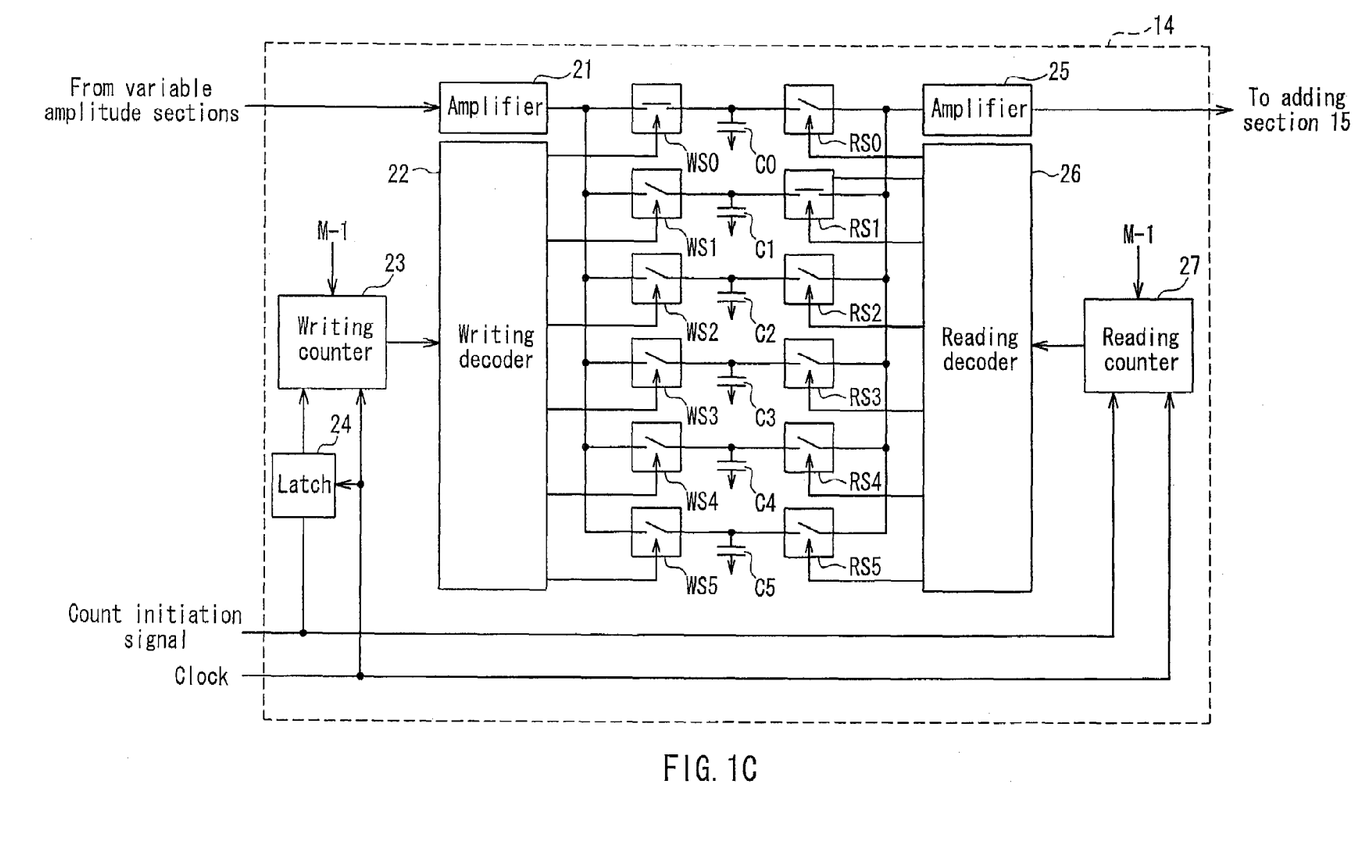
FIG. 1C is a detailed block diagram of a capacitor memory constituting a delay section shown in FIG. 1A.

FIG. 1C is a detailed block diagram of a capacitor memory constituting the delay section 14 shown in FIG. 1A.

In FIG. 1C, the first signal obtained by adding the signals output from the variable amplitude sections 10 and 12 is supplied to an amplifier 21. An output signal from the amplifier 21 is supplied commonly to ends of N (N=6 in the present embodiment) writing switches WS0 to WS5 (in the case of N=6). The turning on/off of the writing switches WS0 to WS5 is controlled by a writing control signal output from a writing decoder 22. The writing decoder 22 is controlled according to a count value output from a writing counter 23 composed of a N-ary (N≧2) counter. To the writing counter 23, a set value (M−1), a clock, and a count initiation signal delayed by a latch 24 (first delay circuit as second delay means) are input.

The other ends of the writing switches WS0 to WS5 are connected to ends of N (N=6 in the present embodiment) capacitors C0 to C5, respectively, while other ends of the capacitors C0 to C5 are connected with a ground potential. Furthermore, still other ends of the capacitors C0 to C5 are connected with ends of N (N=6 in the present embodiment) reading switches RS0 to RS5, respectively. Delay signals of the first signal, which are output from the other ends of the reading switches RS0 to RS5, are supplied to an amplifier 25. The turning on/off of the reading switches RS0 to RS5 is controlled according to a reading control signal output from the reading decoder 26. The reading decoder 26 is controlled according to a count value output from a reading counter 27. To the reading counter 27 composed of the N-ary counter (N≧2), a set value (M−1), a clock, and a count initiation signal are input.

Next, an operation of the ultrasonic diagnostic system configured as described above will be described with reference to FIG. 1A.

First, the vibrator 1 generates a received signal $a(t)\cos(2\pi \cdot f1 \cdot t)$. Herein, t is a time, a(t) is an envelope of the received signal, and f1 is a center frequency of the received signal.

The amplifying section 8 outputs a non-inverted output signal $a(t)\cos(2\pi \cdot f1 \cdot t)$, and an inverted output signal $-a(t)\cos(2\pi \cdot f1 \cdot t)$ based on the received signal input thereto.

Depending upon the switch connection state in the cross point switch 81, the variable amplitude section 10 multiplies the non-inverted output signal or the inverted output signal by a coefficient w(0) to output $\pm w(0) \cdot a(t)\cos(2\pi \cdot f1 \cdot t)$. Furthermore, depending upon the connection state between the non-inverted output and the inverted output in the cross point switch 81, the variable amplitude section 11 multiplies the non-inverted output signal or the inverted output signal by a coefficient w(1) to output $X1(t) = \pm w(1) \cdot a(t)\cos(2\pi \cdot f1 \cdot t)$. The output signal from the variable amplitude section 10 is added to a signal from a variable amplitude section 12 (to be described later), and the signal thus obtained by addition is input to the delay section 14.

The delay section 14 imparts a delay time ΔT=T1/4, which is a quarter of one period T1=1/f of the received signal to the output signal of the variable amplitude section 10, and generates an output signal X0(t) represented by the following expression depending upon the connection state of the cross point switch 81.

$$X0(t) = \pm w(0) \cdot a(t-\Delta T)\cos(2\pi \cdot f1 \cdot (t-\Delta T)) \quad (1)$$

Since $2\pi \cdot f1 \cdot \Delta T = \pi/2$ is satisfied and $a(t-\Delta T)$ is approximated to a(t), Expression (1) can be represented as follows.

$$X0(t) = \pm w(0) \cdot a(t)\cos(2\pi \cdot f1 \cdot t - \pi/2) \quad (2)$$

An output signal X0(t) of the delay section 14 is added in the adding section 15 to an output signal X1(t) obtained by adding the output signal of the variable amplitude section 11 and the output signal of the variable amplitude section 13, thereby to be a sub-beam former output signal Z0(t). For example, in the case where w(0)=0, w(1)=1, and the non-inverted output of the amplifying section 8 is connected to the variable amplitude section 11, the sub-beam former output signal is represented by the following expression.

$$Z0(t) \approx a(t)\cos(2\pi \cdot f1 \cdot t) \quad (3)$$

Furthermore, in the case where w(0)=0.71, w(1)=0.71, the non-inverted output of the amplifying section 8 is connected to the variable amplitude section 10, and the non-inverted output of the amplifying section 8 is connected to the variable amplitude section 11, the sub-beam former output signal is represented by the following expression.

$$Z0(t) \approx a(t)\cos(2\pi \cdot f1 \cdot t - \pi/4) \quad (4)$$

Furthermore, in the case where w(0)=1, w(1)=0, and the non-inverted output of the amplifying section 8 is connected to the variable amplitude section 10, the sub-beam former output signal is represented by the following expression.

$$Z0(t) \approx a(t)\cos(2\pi \cdot f1 \cdot t - \pi/2) \quad (5)$$

Furthermore, in the case where w(0)=0.71, w(1)=0.71, the non-inverted output of the amplifying section 8 is connected to the variable amplitude section 10, and the inverted output of the amplifying section 8 is connected to the variable amplitude section 11, the sub-beam former output signal is represented by the following expression.

$$Z0(t) \approx a(t)\cos(2\pi \cdot f1 \cdot t - 3\pi/4) \quad (6)$$

Furthermore, in the case where w(0)=0, w(1)=1, and the inverted output of the amplifying section 8 is connected to the variable amplitude section 11, the sub-beam former output signal is represented by the following expression.

$$Z0(t) \approx a(t)\cos(2\pi \cdot f1 \cdot t - \pi) \quad (7)$$

Furthermore, in the case where w(0)=0.71, w(1)=0.71, the inverted output of the amplifying section 8 is connected to the variable amplitude section 10, and the inverted output of the amplifying section 8 is connected to the variable amplitude section 11, the sub-beam former output signal is represented by the following expression.

$$Z0(t) \approx a(t)\cos(2\pi \cdot f1 \cdot t - 5\pi/4) \quad (8)$$

Furthermore, in the case where w(0)=1, w(1)=0, and the inverted output of the amplifying section 8 is connected to the variable amplitude section 10, the sub-beam former output signal is represented by the following expression:

$$Z0(t) \approx a(t)\cos(2\pi \cdot f1 \cdot t - 3\pi/2) \quad (9)$$

Furthermore, in the case where w(0)=0.71, w(1)=0.71, the inverted output of the amplifying section 8 is connected to the variable amplitude section 10, and the non-inverted output of the amplifying section 8 is connected to the variable amplitude section 11, the sub-beam former output signal is represented by the following expression.

$$Z0(t) \approx a(t)\cos(2\pi \cdot f1 \cdot t - 7\pi/4) \quad (10)$$

Thus, a phase φa of the received signal $a(t)\cos(2\pi f1 \cdot t)$ of the vibrator 1 can be controlled.

Next, in the case where the variable amplitude section 12 generates a coefficient w(2) and the variable amplitude section 13 generates a coefficient w(3), with respect to a received signal $b(t)\cos(2\pi \cdot f1 \cdot t)$ of the vibrator 2, and the received signal of the vibrator 1 also is considered, the output signal of the adding section 15 is represented by the following expression.

$$Z0(t) \approx a(t)\cos(2\pi \cdot f1 \cdot t + \phi a) + b(t)\cos(2\pi \cdot f1 \cdot t + \phi b) \quad (11)$$

Thus, a phase φb of the received signal b(t)cos(2π·f1·t) of the vibrator 2 also can be controlled, and the received signals of the vibrators 1, 2 in the sub-array 5 can be subjected to phasing addition in the sub-beam former 16. It should be noted that Expression (11) shows the phasing addition by the control of a phase, but actually with a delay in a received signal owing to the delay section 14, more excellent phasing addition is performed.

Similarly, the received signals of the vibrators 3, 4 in the sub-array 6 can be subjected to phasing addition in the sub-beam former 17. The output signals of the sub-beam formers 16 and 17 are subjected to delay addition in the main beam former 18. Thus, the received signals of the vibrators 1 to 4 in the two-dimensional array 7 are subjected to beam forming.

Next, an operation of a capacitor memory constituting the delay section 14 will be described with reference to FIG. 1C.

The set value (M−1) is supplied so as to cause the writing counter 23 and the reading counter 27 to operate as M-ary counters (M≦N).

The writing counter 23 and the reading counter 27 output M count values, i.e., values of 0 to M−1, cyclically. Since the count initiation of the writing counter 23 is delayed by one clock by the latch 24, when the writing counter 23 outputs "0", the reading counter 27 outputs "1". When the writing counter 23 outputs "M−1", the reading counter 27 outputs "M".

When the count value output from the writing counter 23 is "i", the writing decoder 22 outputs a writing control signal that turns on the writing switch WSi and turns off the other writing switches WSj (j≠i). Likewise, when the count value output from the reading counter 27 is "i", the reading decoder 26 outputs a reading control signal that turns on the reading switch RSi and turns off the other reading switches RSj (j≠i).

FIG. 1C shows an exemplary case where the writing switch WS0 is turned on and the reading switch RS1 is turned on. Assuming that the set value (M−1) for the writing counter 23 and the reading counter 27 is 3, the writing counter 23 and the reading counter 27 are M=4-ary, i.e., quaternary counters, and four capacitors C0 to C3 are selected cyclically. As a result, at the same clock timing at which data equivalent to a signal obtained by amplifying the first signal are written in the capacitor C0, data are read out of the capacitor C1, data are read out of the capacitor C2 at a next clock timing, data are read out of the capacitor C3 at a further next clock timing, and data are read out of the capacitor C0 at a still further next clock timing.

Thus, a delay time corresponding to three clocks can be taken between the amplifier 21 and the amplifier 25, and the only requisition is that the foregoing delay time should correspond to a quarter of one period of the received signal. Assuming that a time of one clock is Tck and a time of a quarter of one period of the received signal is Tq, the relationship represented by the following expression is required to be satisfied:

$$(M-1) \cdot Tck \approx Tq \quad (12)$$

Thus, the optimal and minimal value of M can be selected.

It should be noted that in an actual circuit, a noise having a period corresponding to M·Tck occurs to the amplifier 25 since ON resistances of the writing switches WS0 to WS5 and the reading switches RS0 to RS5, capacitances of the capacitors C0 to C5, etc. vary. However, since the value of M is set to a minimal value according to the expression (12) depending on the frequency of the received signal, the frequency of the noise can be set enough higher than the center frequency of the received signal, which is advantageous because the noise can be removed easily by a filter.

As described above, according to the ultrasonic diagnostic system of the first embodiment of the present invention, by providing the sub-beam former 16 composed of the amplifying sections 8, 9, the cross point switches 81, 91, the variable amplitude sections 10 to 13, the delay section 14 composed of a capacitor memory, and the adding section 15, a received signal can be subjected to phasing addition with high precision.

It should be noted that the frequency of the received signal may be a frequency of the fundamental of the received signal or a frequency of harmonics of the same.

Second Embodiment

Figure 2:
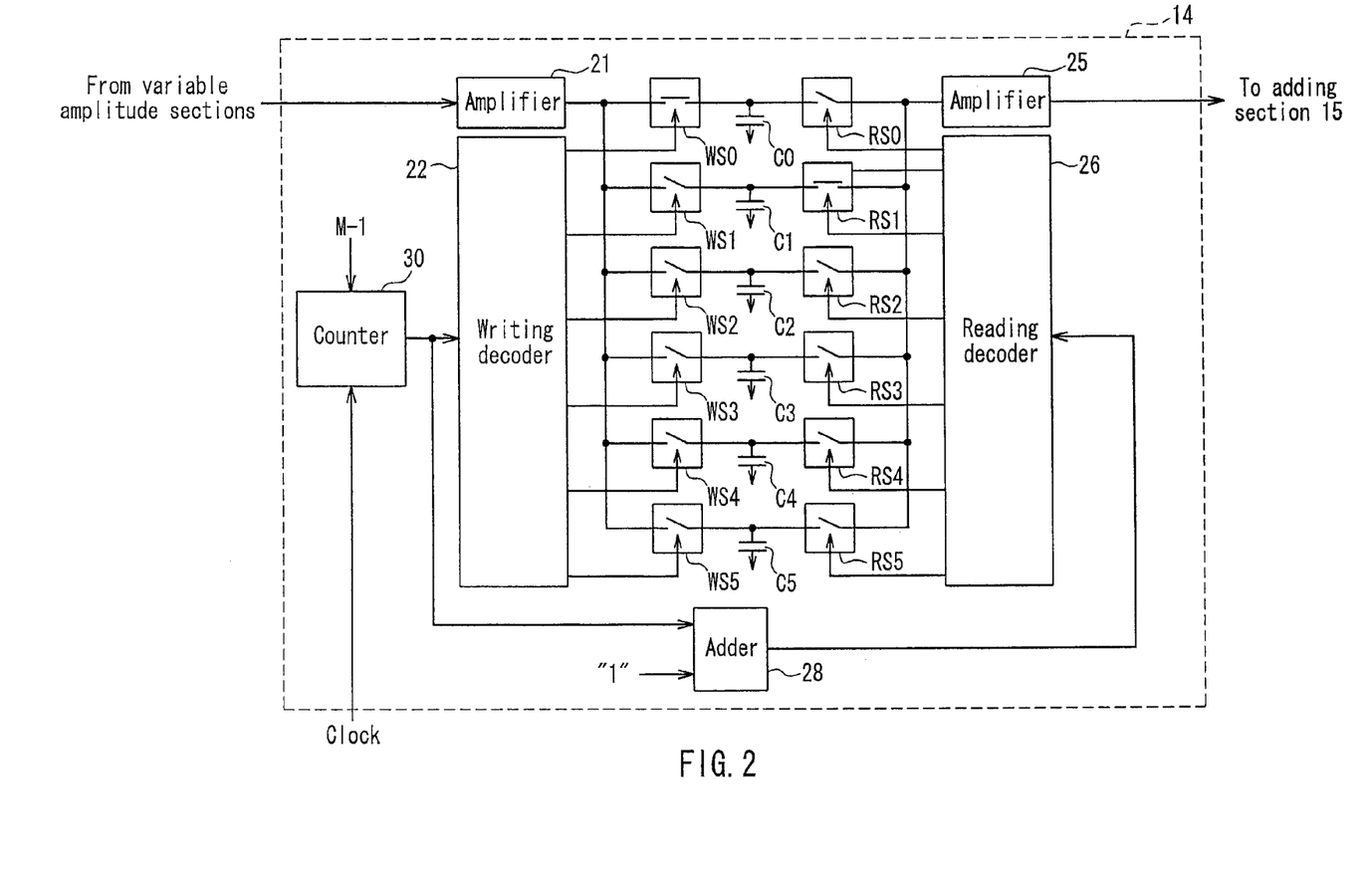
FIG. 2 is a detailed block diagram of a capacitor memory constituting a delay section of a receiving section in an ultrasonic diagnostic system according to a second embodiment of the present invention.

FIG. 2 is a block diagram of a capacitor memory constituting a delay section 14 of a receiving section in an ultrasonic diagnostic system according to a second embodiment of the present invention. It should be noted that in FIG. 2, parts that have the same configurations and functions as those shown in FIG. 1C referred to in conjunction with the first embodiment are designated by the same reference numerals or marks, and descriptions of the same are omitted. Further, the other constituent elements not shown in FIG. 2 are the same as the constituent elements shown in FIGS. 1A, 1B, and 1C.

In FIG. 2, a count value output from a counter 30 is supplied to a writing decoder 22. Further, a value of "1" is added to the count value of the counter 30 by an adder 28 (means for incrementally increasing or decreasing a count value, as second delay means) and thereafter the count value is supplied also to the reading decoder 26.

Next, an operation of a capacitor memory constituting the delay section 14 according to the present embodiment will be described with reference to FIG. 2.

First, a set value (M−1) is supplied so as to cause the counter 30 to operate as a M-ary counter.

The counter 30 outputs M count values, i.e., values of 0 to M−1, cyclically. Since the adder 28 adds a value of "1" to the count value output from the counter 30 and supplies it to the reading decoder 26, when "0" is input to the writing decoder 22, "1" is input to the reading decoder 26. Likewise, when "M−1" is input to the writing decoder 22, "M" is input to the reading decode 26. FIG. 2 shows an exemplary case where the count value output from the counter 30 is "0", the writing switch WS0 is turned on while the other writing switches WSj (j≠0) are turned off, and the reading switch RS1 is turned on while the other reading switches RSj (j≠1) are turned off.

Assuming that the set value (M−1) of the counter 30 is 3, the counter 30 is a M=4-ary, i.e., quaternary counter, and four capacitors C0 to C3 are selected cyclically. As a result, a delay time corresponding to three clocks can be taken between the amplifier 21 and the amplifier 25, and the only requirement is that the foregoing delay time should correspond to a quarter of one period of the received signal.

As described above, according to the ultrasonic diagnostic system according to the second embodiment of the present invention in which the counter 30 and the adder 28 are provided in the delay section 14 in place of the writing counter, the reading counter, and the latch of the first embodiment, a received signal can be delayed with high precision.

It should be noted that though the adder 28 is disposed between the counter 30 and the reading decoder 26 in the configuration described above, a subtracter may be provided instead between the counter 30 and the writing decoder 22.

Further, though an incrementally increasing counter is used as the counter 30, an incrementally decreasing counter may be used instead. In such a case, the position where the adder or subtracter is disposed is inverted as compared with the case of the incrementally increasing counter.

Third Embodiment

Figure 3:
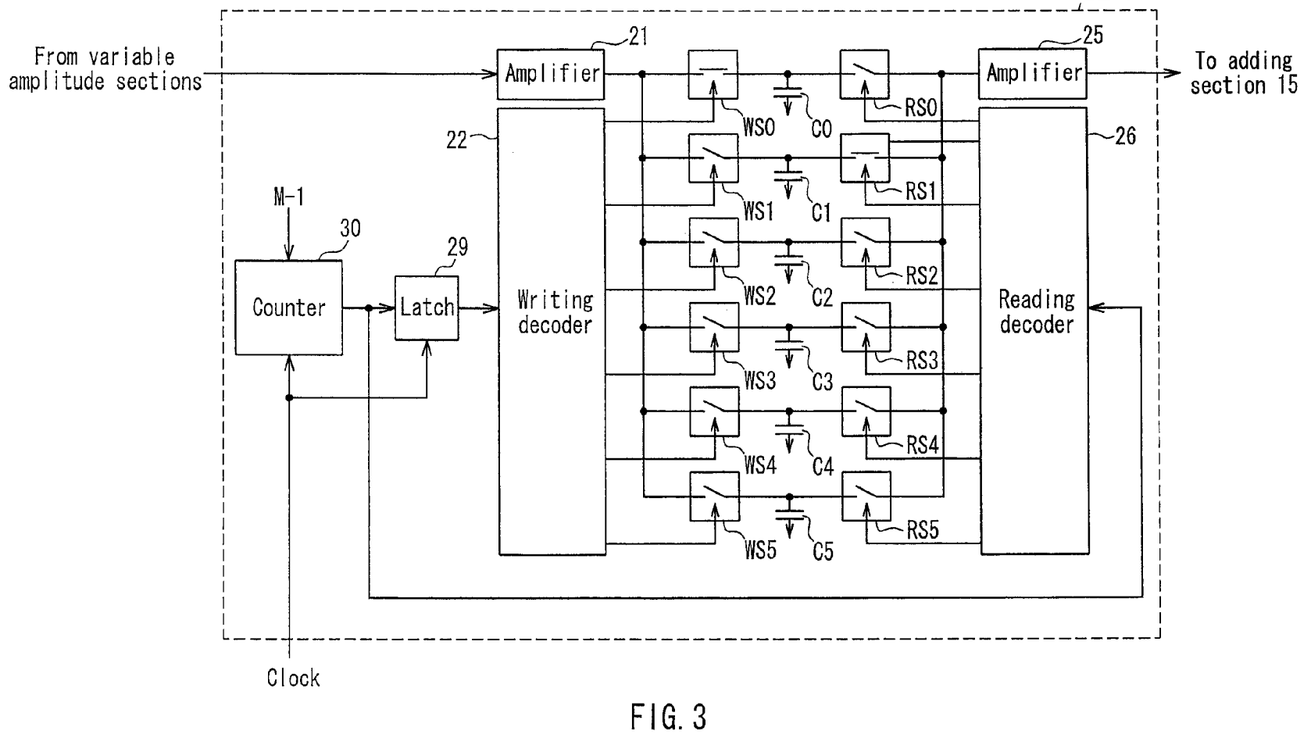
FIG. 3 is a detailed block diagram of a capacitor memory constituting a delay section of a receiving section in an ultrasonic diagnostic system according to a third embodiment of the present invention.

FIG. 3 is a block diagram of a capacitor memory constituting a delay section 14 of a receiving section in an ultrasonic diagnostic system according to a third embodiment of the present invention. It should be noted that in FIG. 3, parts that have the same configurations and functions as those shown in FIG. 1C referred to in conjunction with the first embodiment are designated by the same reference numerals or marks, and descriptions of the same are omitted. Further, the other constituent elements not shown in FIG. 3 are the same as the constituent elements shown in FIGS. 1A, 1B, and 1C.

In FIG. 3, a count value output from a counter 30 is supplied to a writing decoder 22 via a latch 29 (second delay circuit as second delay means). Further, the count value of the counter 30 also is supplied to the reading decoder 26.

Next, an operation of a capacitor memory constituting the delay section 14 according to the present embodiment will be described with reference to FIG. 3.

First, a set value (M−1) is supplied to the counter 30 so as to cause the counter 30 to operate as a M-ary counter.

The counter 30 outputs M count values, i.e., values of 0 to M−1, cyclically. The latch 29 outputs values one clock before the count values output from the counter 30, that is, (M−1), 0, ... (M−2). Therefore, when "0" is input to the writing decoder 22, "1" is input to the reading decoder 26, and when "M−1" is input to the writing decoder 22, "M" is input to the reading decoder 26. FIG. 3 shows an exemplary case where the count value output from the counter 30 is "0", the writing switch WS0 is turned on while the other writing switches WSj (j≠0) are turned off, and the reading switch RS1 is turned on while the other reading switches RSj (j≠1) are turned off.

Assuming that the set value (M−1) of the counter 30 is 3, the counter 30 is a M=4-ary, i.e., quarternary, counter, and four capacitors C0 to C3 are selected cyclically. As a result, a delay time corresponding to three clocks can be taken between the amplifier 21 and the amplifier 25, and the only requirement is that the foregoing delay time should correspond to a quarter of one period of the received signal.

As described above, according to the ultrasonic diagnostic system according to the third embodiment of the present invention in which the counter 30 and the latch 29 are provided in the delay section 14 in place of the writing counter, the reading counter, and the latch of the first embodiment, a received signal can be delayed with high precision.

INDUSTRIAL APPLICABILITY

The ultrasonic diagnostic system according to the present invention has an advantage that a received signal from electroacoustic transducers arranged two-dimensionally can be phased with high precision. The system is useful as an ultrasonic diagnostic system or the like that has a two-dimensional array and scans a subject three-dimensionally, and is applicable for medical purposes and the like.

The invention claimed is:

1. An ultrasonic diagnostic system, comprising:
   electroacoustic conversion component in which a plurality of sub-arrays, each composed of a plurality of electroacoustic transducers, are arranged at least two-dimensionally;
   sub-beam formers that are provided on the sub-array basis, for subjecting signals output from the electroacoustic conversion component to delay addition; and
   a main beam former for subjecting signals output from the sub-beam formers to delay addition,
   wherein each sub-beam former,
      from each of received signals from the electroacoustic transducers in the sub-array, generates a non-inverted signal and an inverted signal having different polarities from each other, respectively,
      obtains a first signal by controlling amplitudes of the signals having a first polarity among the polarities, followed by adding, and obtains a second signal by controlling amplitudes of the signals having a second polarity among the polarities, followed by adding,
      delays only one of the first signal and the second signal according to a delay time corresponding to a quarter of one period of the received signal by a delay component composed of a capacitor memory provided inside, while the other one of the first signal and the second signal is not delayed, and
      adds the first signal and the second signal to which the delay time difference is imparted.

2. The ultrasonic diagnostic system according to claim 1, wherein each sub-beam former includes:
   amplifying sections provided on the sub-array basis, each amplifying section generating a non-inverted signal and an inverted signal that have different polarities from each other, from a received signal from the corresponding electroacoustic transducer in the sub-array,;
   cross point switches, each selectively switching the non-inverted signal and the inverted signal output from the corresponding amplifying section and outputting the same;
   variable amplitude sections for outputting the first signal and the second signal, the first signal being obtained by controlling amplitudes of the non-inverted signals output from the cross point switch, followed by adding, and the second signal being obtained by controlling amplitudes of the inverted signals output from the cross point switch, followed by adding;
   a delay section for delaying only one of the first signal and the second signal output from the variable amplitude sections. according to a delay time corresponding to a quarter of one period of the received signal, while the other one of the first signal and the second signal is not delayed; and
   an adding section for adding an output signal from the delay section and output signals from the variable amplitude sections.

3. An ultrasonic diagnostic system, comprising:
   electroacoustic conversion component in which a plurality of sub-arrays, each composed of a plurality of electroacoustic transducers, are arranged at least two-dimensionally;
   sub-beam formers that are provided on the sub-array basis, for subjecting signals output from the electroacoustic conversion component to delay addition; and
   a main beam former for subjecting signals output from the sub-beam formers to delay addition,
   wherein each sub-beam former,
      from each of received signals from the electroacoustic transducers in the sub-array, generates a non-inverted signal and an inverted signal having different polarities from each other, respectively,
      obtains a first signal by controlling amplitudes of the signals having a first polarity among the polarities, followed by adding, and obtains a second signal by controlling amplitudes of the signals having a second polarity among the polarities, followed by adding, imparts a delay time difference corresponding to a quarter of one period of the received signal between the first signal and the second signal by a first delay component composed of a capacitor memory provided inside, and adds the first signal and the second signal to which the delay time difference is imparted, wherein the capacitor memory includes:

at least one N-ary counter ($N \geq 2$);

a writing decoder that receives a count value output from the counter and outputs N writing control signals;

N writing switches that commonly receive the first signal at ends thereof, and are turned on/off according to the N writing control signals, respectively;

N capacitors whose ends are connected to the other ends of the N writing switches and whose other ends are connected to a ground potential;

a reading decoder that receive the count value output from the counter and output N reading control signals;

N reading switches that receive potentials of the N capacitors at ends thereof, respectively, are turned on/off according to the N reading control signals, respectively, and output delay signals of the first signal via the other ends thereof that are connected commonly; and second delay component for imparting a delay time difference between an operation of the writing decoder and an operation of the reading decoder.

4. The ultrasonic diagnostic system according to claim 3, wherein the counter can be set to be M-ary ($M \geq N$) according to a frequency of the received signal.

5. The ultrasonic diagnostic system according to claim 3, wherein the counter comprises a writing counter outputting a count value to the writing decoder, and a reading counter outputting a count value to the reading decoder, and the second delay component is a first delay circuit for delaying an operation initiation timing of the writing counter.

6. The ultrasonic diagnostic system according to claim 3, wherein the second delay component is disposed between an output end of the counter and an input end of the reading decoder, or between the output end of the counter and an input end of the writing decoder, and is configured for incrementally increasing or decreasing the count value output from the counter.

7. The ultrasonic diagnostic system according to claim. 3, wherein the second delay component is disposed between an output end of the counter and an input end of the writing decoder, and is a second delay circuit for delaying the count value output from the counter.

* * * * *